United States Patent
Nardi et al.

(10) Patent No.: US 9,993,872 B2
(45) Date of Patent: Jun. 12, 2018

(54) FLUIDIZED BED FOR DEGASSING AND HEAT TREATING POWDERS

(71) Applicant: United Technologies Corporation, Hartford, CT (US)

(72) Inventors: Aaron T. Nardi, East Granby, CT (US); Michael A. Klecka, Coventry, CT (US); Ying She, East Hartford, CT (US); Zissis A. Dardas, Worcester, MA (US)

(73) Assignee: United Technologies Corporation, Hartford, CT (US)

( * ) Notice: Subject to any disclaimer, the term of this patent is extended or adjusted under 35 U.S.C. 154(b) by 325 days.

(21) Appl. No.: 14/786,852

(22) PCT Filed: Apr. 11, 2014

(86) PCT No.: PCT/US2014/033750
§ 371 (c)(1),
(2) Date: Oct. 23, 2015

(87) PCT Pub. No.: WO2014/176045
PCT Pub. Date: Oct. 30, 2014

(65) Prior Publication Data
US 2016/0144427 A1 May 26, 2016

Related U.S. Application Data

(60) Provisional application No. 61/815,359, filed on Apr. 24, 2013.

(51) Int. Cl.
*B22F 1/00* (2006.01)
*B22F 3/00* (2006.01)
(Continued)

(52) U.S. Cl.
CPC .......... *B22F 1/0085* (2013.01); *B22F 1/0088* (2013.01); *B22F 3/003* (2013.01);
(Continued)

(58) Field of Classification Search
CPC ...... B22F 1/0085; B22F 1/0088; B22F 3/003; B01J 2/16; C21D 1/74
(Continued)

(56) References Cited

U.S. PATENT DOCUMENTS 5,017,437 A * 5/1991 Martin ............... B22F 7/08
419/49
5,387,380 A 2/1995 Cima et al.
(Continued)

FOREIGN PATENT DOCUMENTS

CN 101458035 A 6/2009
EP 1118404 A1 7/2001
(Continued)

OTHER PUBLICATIONS

First Chinese Office Action, for Chinese Patent Application No. 201480023385.1, dated Sep. 5, 2016, 23 pages.
(Continued)

*Primary Examiner* — Mark A Chapman
(74) *Attorney, Agent, or Firm* — Kinney & Lange, P.A.

(57) ABSTRACT

A method includes introducing metallic powder into a fluidizing chamber of a fluidized bed reactor. A fluidization gas is flowed into the fluidizing chamber. The metallic power becomes entrained in the flow of the fluidization gas. Adsorbed water is removed from the metallic powder by exposing the metallic powder to the fluidization gas for a duration of time and at a treatment temperature to cause the adsorbed water to be removed from the metallic powder.

18 Claims, 3 Drawing Sheets

(51) Int. Cl.
*C21D 1/74* (2006.01)
*C21D 9/00* (2006.01)
*B22F 3/105* (2006.01)
*B33Y 10/00* (2015.01)
*B33Y 30/00* (2015.01)
*B33Y 40/00* (2015.01)
*B33Y 70/00* (2015.01)

(52) U.S. Cl.
CPC ............. *C21D 1/74* (2013.01); *C21D 9/0068* (2013.01); *B22F 2003/1056* (2013.01); *B22F 2201/02* (2013.01); *B22F 2998/10* (2013.01); *B33Y 10/00* (2014.12); *B33Y 30/00* (2014.12); *B33Y 40/00* (2014.12); *B33Y 70/00* (2014.12); *Y02P 10/295* (2015.11)

(58) Field of Classification Search
USPC .......................................................... 419/31
See application file for complete search history.

(56) References Cited

U.S. PATENT DOCUMENTS

| | | | |
|---|---|---|---|
| 5,624,879 | A | 4/1997 | Smith et al. |
| 2004/0109819 | A1 | 6/2004 | Alt et al. |
| 2006/0251805 | A1 | 11/2006 | White et al. |
| 2011/0247232 | A1 | 10/2011 | Shun et al. |
| 2012/0329659 | A1 | 12/2012 | Holcomb |

FOREIGN PATENT DOCUMENTS

| | | | |
|---|---|---|---|
| JP | H0571875 | A | 3/1993 |
| JP | 2000160203 | A | 6/2000 |
| JP | 2009262061 | A | 11/2009 |
| KR | 20120048703 | A | 5/2012 |
| WO | 2012178206 | A2 | 12/2012 |
| WO | WO2012178206 | A2 | 12/2012 |

OTHER PUBLICATIONS

Office Action for Chinese Patent Application Serial No. 201480023385.1, dated Mar. 9, 2017, 14 Pages.
Extended European Search Report, for European Patent Application No. 14787479.6, dated Jun. 7, 2016, 9 pages.
Third Chinese Office Action for CN Application No. 201480023385.1, dated Sep. 4, 2017, 23 Pages.
Communication Pursuant to Article 94(3) EPC for EP Application No. 14787479.6, dated Aug. 18, 2017, 7 Pages.
International Search Report and Written Opinion from PCT Application Serial No. PCT/US2014/033750, dated Jul. 30, 2014, 14 pages.

* cited by examiner

FLUIDIZED BED FOR DEGASSING AND HEAT TREATING POWDERS

BACKGROUND

The present invention relates to additive manufacturing, and in particular, to heat treatment of powders used in additive manufacturing.

In the preparation of metal powders for additive manufacturing, the surface of the powder can oxidize very quickly. When the oxidized surface of the powder is exposed to the environment, water can adsorb into the surface and adsorbs on the oxide. Once the powder is used during the additive manufacturing process, the water adsorbed into the powder can cause voids in the formed end-material. Methods of removing water from the additively manufactured materials can cause the formation of hydrogen in the end-material which can make the end-material more brittle.

Previous methods of removing adsorbed water from the metal powder during additive manufacturing include various methods of degassing. Traditional methods of degassing involve the use of very low pressure vacuums and high temperatures. Complications can occur maintaining a very low pressure vacuum during the degassing. Additionally, traditional methods of high temperature heat treatment can cause unwanted sintering of the metallic powder.

SUMMARY

A method includes introducing metallic powder into a fluidizing chamber of a fluidized bed reactor. A fluidization gas is flowed into the fluidizing chamber. The metallic powder becomes entrained in the flow of the fluidization gas. Adsorbed water is removed from the metallic powder by exposing the metallic powder to the fluidization gas for a duration of time and at a treatment temperature to cause the adsorbed water to be removed from the metallic powder.

A system includes a fluidized bed reactor having a fluidizing chamber that receives a metallic powder. A fluidization gas source connected to the fluidizing chamber provides a fluidization supply gas. The fluidization supply gas flows into the fluidizing chamber causing the metallic powder to become suspended in the fluidization supply gas. A heater maintains a temperature inside the fluidizing chamber sufficient to cause adsorbed water to be removed from the metallic powder. The metallic powder is then used by an additive manufacturing apparatus to form objects.

DETAILED DESCRIPTION

Figure 1:
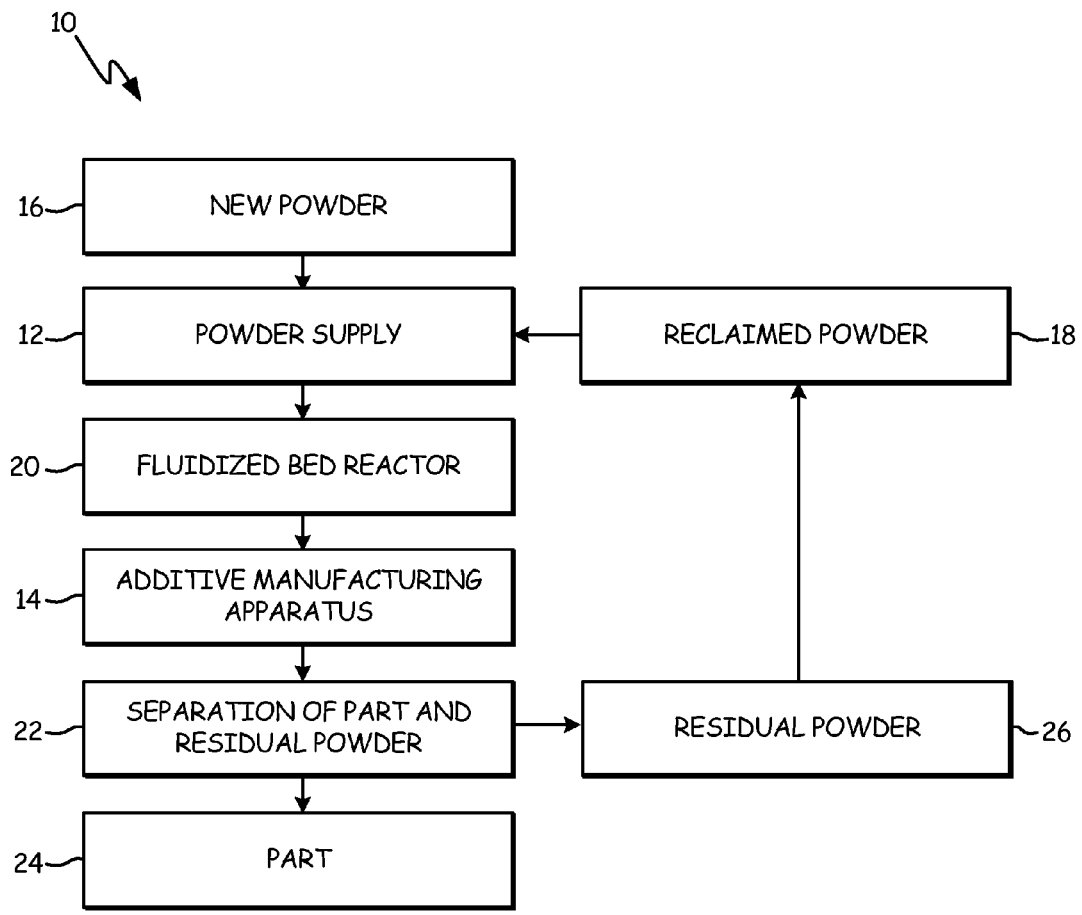
FIG. 1 is a schematic block diagram of a method incorporating the present invention.

FIG. 1 shows a flow chart of cycle 10 for removing water from powder supply 12 prior to use of powder supply 12 in additive manufacturing apparatus 14. Cycle 10 includes combining new powder 16 with reclaimed powder 18 to form powder supply 12. Powder supply 12 is moved into fluidized bed reactor 20 to prepare powder supply 12 for additive manufacturing apparatus 14. After an additive manufacturing process is performed by additive manufacturing apparatus 14, part 24 is separated 22 from residual powder 26. Residual powder 26 is reclaimed from additive manufacturing apparatus 14 and becomes reclaimed powder 18. Reclaimed powder 18 is then recombined with powder supply 12 to be reused in cycle 10.

Fluidized bed reactor 20 is used to prepare powder supply 12 in additive manufacturing apparatus 14. Fluidized bed reactor 20 prepares powder supply 12 by fluidizing powder supply 12 and applying a heat treatment to powder supply 12. Combining fluidization and heat treatment of powder supply 12 allows for an effective process to remove adsorbed water from powder supply 12. Fluidizing powder supply 12 suspends the particles in fluidization gas 34 and separates the individual particles of powder supply 12 from one another. During the application of the heat treatment, the particles of powder supply 12 are prevented from sintering because the particles of powder supply 12 are not in close proximity to each other. The use of fluidized bed reactor 20 provides an improvement over traditional methods of degassing due to the static nature of un-fluidized particles of powder supply 12 and their close proximity to other particles. With traditional methods, the close proximity of the particles of powder supply 12 can cause sintering of powder supply 12 as powder supply 12 is heat treated.

Figure 2:
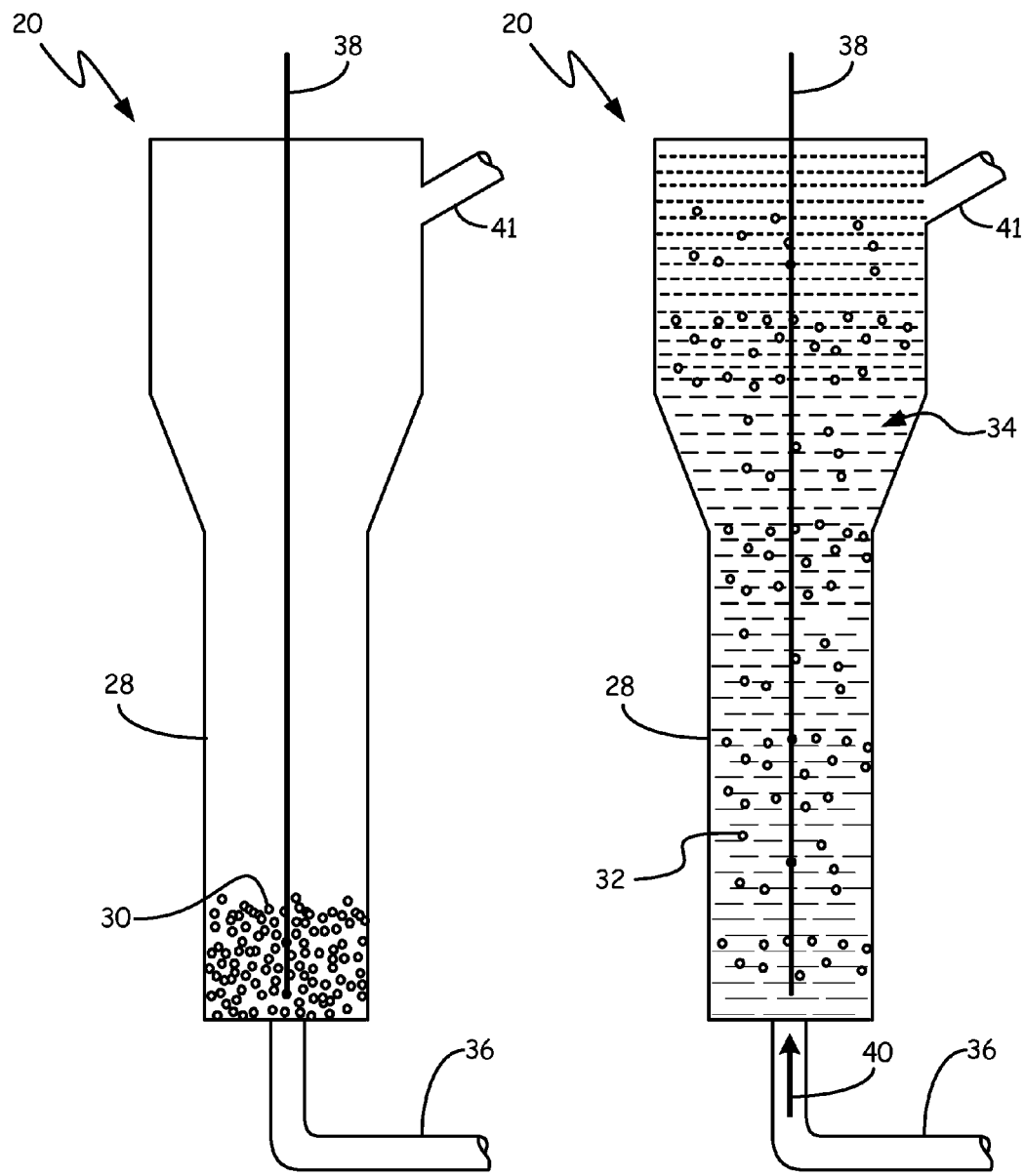
FIG. 2A is a schematic, cross-sectional elevation view of an exemplary embodiment of a fluidized bed reactor in accordance with the present invention.
FIG. 2B is a schematic, cross-sectional elevation view of an exemplary embodiment of a fluidized bed reactor in accordance with the present invention.

FIG. 2A shows a schematic, cross-sectional elevation view of an exemplary embodiment of fluidized bed reactor 20 in accordance with the present invention. Fluidized bed reactor 20 includes fluidizing chamber 28. Un-fluidized powder 30 is introduced into fluidizing chamber 28. Before a fluidizing process begins, un-fluidized powder 30 rests on the bottom of fluidizing chamber 28.

FIG. 2B shows a schematic, cross-sectional elevation view of an exemplary embodiment of fluidized bed reactor 20 in accordance with the present invention. The unfluidized powder 30 of FIG. 2A becomes fluidized powder 32 when fluidization gas 34 is introduced into fluidizing chamber 28. Fluidized powder 32 becomes suspended in fluidization gas 34 as fluidization gas 34 is introduced through fluidizing chamber 28. Fluidization gas 34 enters fluidizing chamber 28 through feed line 36 at the bottom of fluidized bed reactor 20. Thermocouple 38 is located in fluidizing chamber 28. Thermocouple 38 controls the temperature inside of fluidizing chamber 28 to provide a reaction temperature sufficient to cause any adsorbed water to be removed from fluidized powder 32. Fluidization gas 34 is introduced into fluidization chamber 28 at flow rate 40. The presence of fluidization gas 34 also aids in drawing adsorbed water from of fluidized powder 32. Fluidization gas 34 can include nitrogen, or any other dry gas. Fluidization gas 34 exits fluidizing chamber 28 through exit line 41.

Removing adsorbed water from fluidized powder 32 prevents voids in the end-material created during the additive manufacturing process. Using fluidized bed reactor 20 also prevents sintering of un-fluidized powder 30. The particles of fluidized powder 32 are not touching each other in a static location as they are in un-fluidized powder 30. When un-fluidized powder 30 is heated, the particles of un-fluidized powder 30 can sinter due to their relative proximity to each other and the high temperature heat in fluidizing chamber 28. The particles of fluidized powder 32 are not resting closely proximate to other particles of fluidized powder 32, thus reducing the occurrence of sintering fluidized powder 32 when the temperature of fluidizing chamber 28 is raised. Fluidized bed reactor 20 of the present invention can be used for high temperature annealing to allow for heating to substantially high temperatures without sintering of fluidized powder 32. The use of fluidized bed reactor 20 also obviates the complications involved with maintaining a very low pressure vacuum used with traditional degassing methods.

Figure 3:
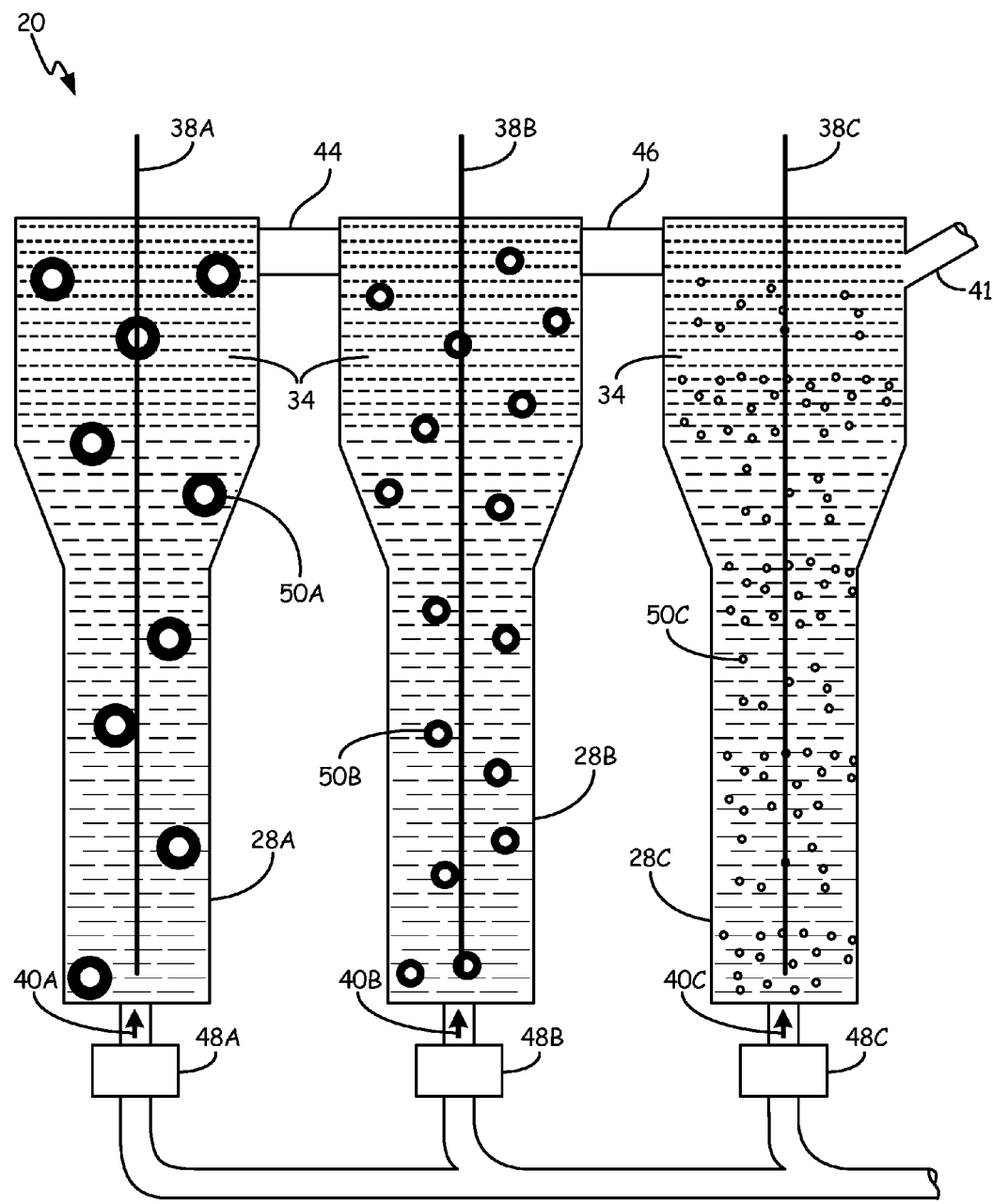
FIG. 3 is a schematic, cross-sectional view of an exemplary embodiment of a series of fluidized bed reactors in accordance with the present invention.

FIG. 3 is a schematic, cross-sectional view of an exemplary embodiment of fluidized bed reactor 20 in accordance with the present invention. Fluidized bed reactor 20 includes first fluidizing chamber 28A, second fluidizing chamber 28B, and third fluidizing chamber 28C. First fluidizing chamber 28A is fluidly connected to second fluidizing chamber 28B by first connection line 44. Second fluidizing chamber 28B is fluidly connected to third fluidizing chamber 28C by second connection line 46. First thermocouple 38A is located in first fluidizing chamber 28A, second thermocouple 38B is located in second fluidizing chamber 28B, and third thermocouple 38C is located in third fluidizing chamber 28C. Fluidization gas 34 exits fluidizing chamber 28C through exit line 41.

During the fluidizing process, the flow rates of fluidization gas 34 are controlled in each of first fluidizing chamber 28A, second fluidizing chamber 28B, and third fluidizing chamber 28C in order to classify certain sizes of fluidized powder 32. First flow rate 40A, second flow rate 40B, and third flow rate 40C of fluidization gas 34 are selected in each of first fluidizing chamber 28A, second fluidizing chamber 28B, and third fluidizing chamber 28C to entrain first powder particles 50A, second powder particles 50B, and third powder particles 50C respectively. A large first flow rate 50A of fluidization gas 34 is introduced in first fluidizing chamber 28A such that larger first powder particles 50A become suspended in fluidization gas 34. First flow rate 40A is controlled by first flow controller 48A. Second powder particles 50B and third powder particles 50C, both of which are smaller in size than first powder particles 50A, are carried in first flow rate 40A of fluidization gas 16 out of first fluidizing chamber 28A through first connection line 44 and into second fluidizing chamber 28B. An example of the size of first powder particles 50A suspended in first fluidizing chamber 28A would be of a size greater than 100 micrometers.

Second flow rate 40B of fluidization gas 34, slower than first flow rate 40A of fluidization gas 34 corresponding with first fluidizing chamber 28A, is introduced into second fluidizing chamber 28B. In second fluidizing chamber 28B, second powder particles 50B become suspended in fluidization gas 34. Third powder particles 50C, being smaller than second powder particles 50B, are carried out of second fluidizing chamber 28B through second connection line 46 and into third fluidizing chamber 28C. Second flow controller 48B controls the second flow rate 40B of fluidization gas 34 entering into second fluidizing chamber 28B. An example of the size of second powder particles 50B suspended in second fluidizing chamber 28B would range in sizes between 100 micrometers and 50 micrometers.

Third flow rate 40C of fluidization gas 34, slower than second flow rate 40B of fluidization gas 34 corresponding with second fluidizing chamber 28B, is introduced into third fluidizing chamber 28C. In third fluidizing chamber 28C, third powder particles 50C become suspended in fluidization gas 34. Third flow controller 48C controls the third flow rate 40C of fluidization gas 34 entering into third fluidizing chamber 28C. An example of the size of third powder particles 50C suspended in third fluidizing chamber 28C would range in sizes between 50 micrometers and 15 micrometers.

Selectively controlling the powder particle size for different fluidization chambers enables size classification of powders based on the fluidization gas flow rates introduced into each fluidizing chamber and diameters of each fluidizing chamber. Depending on the powder particle size, a certain flow rate is chosen to float different particle sizes within each of the fluidized bed reactors.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A method includes introducing metallic powder into a fluidizing chamber of a fluidized bed reactor. A fluidization gas is flowed into the fluidizing chamber. The metallic powder is entrained in a flow of the fluidization gas. Adsorbed water is removed from the metallic powder by exposing the metallic powder to the fluidization gas for a duration of time and at a treatment temperature sufficient to cause the adsorbed water to be removed from the metallic powder.

The method of the preceding paragraph can optionally include, additionally and/or alternatively, any one or more of the following features, configurations, and/or additional components:

the fluidization gas includes a gas or a mixture of gases with desirable characteristics;

the fluidization gas includes nitrogen gas;

the method further includes using the metallic powder in an additive manufacturing process;

the adsorbed water is removed from the metallic powder by heating the fluidizing chamber to a temperature less than a sintering temperature of the metallic powder;

the method further includes a selective fluidizing system that is capable of floating different particle sizes of the metallic powder within the fluidized bed reactor based upon on the particle size of the metallic powder;

the method further includes selecting a fluidization gas flow rate to float a desired size of metallic powder particles within the fluidizing chamber;

the method further includes multiple fluidizing chambers;

the multiple fluidizing chambers separate different particle sizes of the metallic powder into different fluidized bed reactors;

the multiple fluidizing chambers use selective flow rates of the fluidization gas to separate off metallic powder with a certain size associated with each fluidizing chamber; and the method is used in an additive manufacturing process including cold spray of the metallic powder.

A system includes a fluidized bed reactor, a fluidization gas source, a heater, and an additive manufacturing apparatus. The fluidized bed reactor has a fluidizing chamber that receives a metallic powder. The fluidization gas source is connected to the fluidizing chamber to provide a fluidization supply gas that flows into the fluidizing chamber causing the metallic powder to become suspended in the fluidization supply gas. The heater maintains a temperature in the fluidizing chamber sufficient to cause adsorbed water to be removed from the metallic powder. The additive manufacturing apparatus uses the metallic powder to form objects.

The system of the preceding paragraph can optionally include, additionally and/or alternatively, any one or more of the following features, configurations, and/or additional components:

the fluidization supply gas includes a gas or mixture gases with desired characteristics;

the fluidization supply gas includes dry nitrogen gas;

the fluidized bed reactor removes the adsorbed water from the powder by heating the fluidizing chamber to a temperature less than a sintering temperature of the metallic powder;

the fluidized bed reactor comprises a plurality of fluidizing chambers capable of floating different particle sizes of the metallic powder within the fluidized bed reactor based upon on a particle size of the powder;

the fluidized bed reactor includes flow rate controllers for selecting a fluidization supply gas flow rate to float a desired particle size of the metallic powder within each fluidizing chamber; and the system performs an additive manufacturing processes including cold spray of the metallic powder.

The invention claimed is:

1. A method comprising:
introducing metallic powder into a fluidizing chamber of a fluidized bed reactor;
flowing a fluidization gas into the fluidizing chamber;
entraining the metallic powder in a flow of the fluidization gas so that particles of the metallic powder are separated from one another such that the particles of the metallic powder are prevented from sintering; and
removing adsorbed water from the metallic powder by exposing the metallic powder to the fluidization gas for a duration of time and at a treatment temperature sufficient to cause the adsorbed water to be removed from the metallic powder.

2. The method of claim 1, wherein the fluidization gas includes a gas or a mixture of gases.

3. The method of claim 2, wherein the fluidization gas includes nitrogen gas.

4. The method of claim 1, and further comprising using the metallic powder in an additive manufacturing process.

5. The method of claim 1, wherein the method further comprises removing the adsorbed water from the metallic powder by heating the fluidizing chamber to a temperature less than a sintering temperature of the metallic powder.

6. The method of claim 1, wherein the method further comprises a selective fluidizing system that is capable of floating different particle sizes of the metallic powder within the fluidized bed reactor based upon on the particle size of the metallic powder.

7. The method of claim 6, wherein the method further comprises selecting a fluidization gas flow rate to float a desired size of metallic powder particles within the fluidizing chamber.

8. The method of claim 6, wherein the method further comprises multiple fluidizing chambers.

9. The method of claim 8, wherein the multiple fluidizing chambers separate different particle sizes of the metallic powder into different fluidized bed reactors.

10. The method of claim 8, wherein the multiple fluidizing chambers use selective flow rates of the fluidization gas to separate off metallic powder with a certain size associated with each fluidizing chamber.

11. The method of claim 1, wherein the method is used in an additive manufacturing process including cold spray of the metallic powder.

12. A system comprising:
a fluidized bed reactor having a fluidizing chamber that receives a metallic powder;
a fluidization gas source connected to the fluidizing chamber to provide a fluidization supply gas that flows into the fluidizing chamber causing the metallic powder to become suspended in the fluidization supply gas so that particles of the metallic powder are separated from one another such that the particles of the metallic powder are prevented from sintering;
a heater that maintains a temperature in the fluidizing chamber sufficient to cause adsorbed water to be removed from the metallic powder; and
an additive manufacturing apparatus that uses the metallic powder to form objects.

13. The system of claim 12, wherein the fluidization supply gas includes a gas or a mixture of gases.

14. The system of claim 13, wherein the fluidization supply gas includes dry nitrogen gas.

15. The system of claim 12, wherein the fluidized bed reactor removes the adsorbed water from the powder by heating the fluidizing chamber to a temperature less than a sintering temperature of the metallic powder.

16. The system of claim 12, wherein the fluidized bed reactor comprises a plurality of fluidizing chambers capable of floating different particle sizes of the metallic powder within the fluidized bed reactor based upon on a particle size of the powder.

17. The system of claim 16, wherein the fluidized bed reactor includes flow rate controllers for selecting a fluidization supply gas flow rate to float a desired particle size of the metallic powder within each fluidizing chamber.

18. The system of claim 12, wherein the system performs an additive manufacturing process including cold spray of the metallic powder.

* * * * *

UNITED STATES PATENT AND TRADEMARK OFFICE
CERTIFICATE OF CORRECTION

PATENT NO. : 9,993,872 B2
APPLICATION NO. : 14/786852
DATED : June 12, 2018
INVENTOR(S) : Aaron T. Nardi et al.

Page 1 of 1

It is certified that error appears in the above-identified patent and that said Letters Patent is hereby corrected as shown below:

On the Title Page

Item (57) Abstract, Column 2, Line 4:
Delete "power"
Insert --powder--

Signed and Sealed this
Twenty-eighth Day of May, 2019

Andrei Iancu
*Director of the United States Patent and Trademark Office*